Patented Aug. 2, 1949

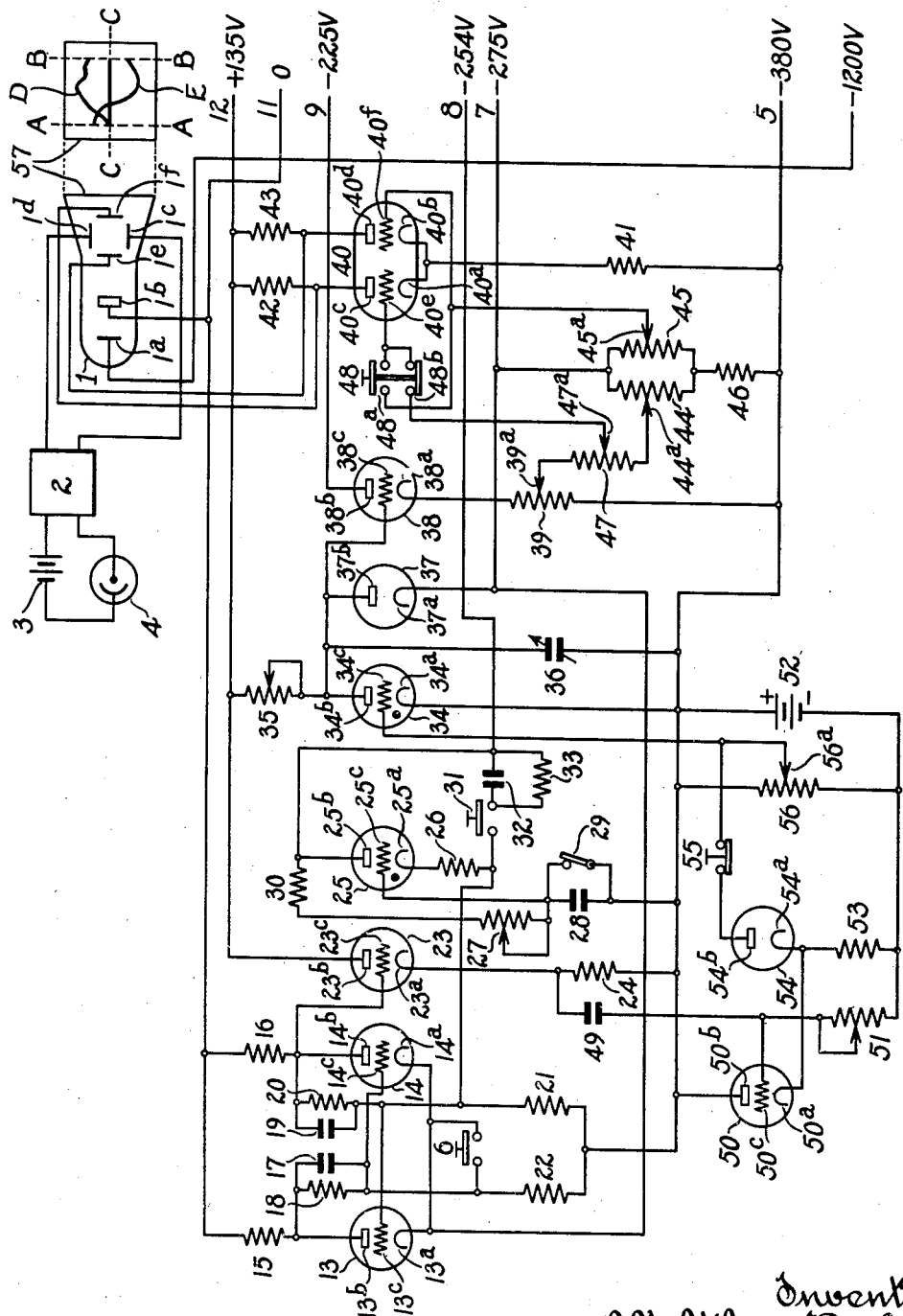

2,477,770

UNITED STATES PATENT OFFICE 2,477,770

ELECTRONIC TIMING AND RECORDING MEANS

Walther Richter, Whitefish Bay, Wis., assignor to Cutler-Hammer, Inc., Milwaukee, Wis., a corporation of Delaware Application April 3, 1944, Serial No. 529,382

10 Claims. (Cl. 315—26)

The invention relates to means for recording a characteristic of phenomena and is particularly applicable to the recording of a characteristic of transient phenomena of very short duration.

It is very often desirable to record complex phenomena by means of a cathode ray oscilloscope or the like. It has hitherto been the practice to provide a circuit which is responsive to the desired characteristic of the phenomenon, which circuit afforded an eletcrical potential which varied in accordance with the desired characteristic, and to impress said electrical potential between one pair of plates of a cathode ray tube of an oscilloscope, while the other pair of plates of said tube was subjected to a periodically varying potential of substantially saw-tooth wave shape. When the transient phenomenon varied many times between limits and/or was of long duration, the number of traces made by the oscilloscope crossed each other many times so that the picture obtained was very confusing.

The present system provides means which prevent a phenomenon from affecting the oscilloscope during any desired period thereof and thus make it possible to record a characteristic of any other desired period of the phenomenon. It is thus possible to obtain a much more detailed and accurate record of any period of the phenomenon which requires special investigation.

An object of the present invention is the provision of improved means to record a characteristic of a phenomenon of very short duration.

Another object is to provide means affording a time delay between the beginning of a transient and the moment at which the recorder starts recording the desired characteristic.

Another object is to provide means to record a characteristic of a phenomenon during a given period thereof.

Another object is to generate a given number of cycles of a saw-tooth voltage.

Another object is to provide a saw-tooth voltage whose reference potential may be varied, while its maximum departure from said reference potential in opposite directions varies by equal amounts.

Other objects and advantages will hereinafter appear. The accompanying drawing illustrates an embodiment of the invention.

The accompanying drawing is a diagrammatic representation of a system incorporating the invention as applied to the control of an oscilloscope which is adapted to record a characteristic of a phenomenon of very short duration or a part only of the entire period of such phenomenon, the system being arranged in such manner that any desired fraction of the duration of the phenomenon may be selected for indication and recording by the oscilloscope.

Referring to the drawing, 1 is a cathode ray tube having a cathode $1^a$ and an anode $1^b$, two deflecting plates $1^e$ and $1^f$, respectively, for the horizontal deflection of the electron beam and two deflecting plates $1^c$ and $1^d$, respectively, for the vertical deflection of the electron beam. The deflecting plates $1^c$ and $1^d$ are supplied with a voltage which varies in accordance with a characteristic of the phenomenon which is to be investigated. In the drawing the plates are shown supplied with said voltage through any suitable amplifier 2, whose input current is supplied by a battery 3, while the amplifier is responsive to a photo-electric cell 4. This cell has its illumination varied in a suitable manner in accordance with the characteristic of the phenomenon to be investigated. In other words, as the impedance of the photo cell 4 varies according to the variation of the desired characteristic of the phenomenon, it varies in turn the current supplied to the amplifier 2. As a result, the amplifier impresses a voltage on the plates $1^c$ and $1^d$ which creates an electric field whose gradient is transverse to the electron beam so as to deflect the electron beam in accordance with the variation of the phenomenon affecting the impedance of the photo-electric cell 4. It is obvious that any other suitable means may be employed to vary the voltage on the plates $1^c$ and $1^d$ in accordance with the quantity to be investigated.

The horizontal deflection of the electron beam is controlled by the plates $1^e$ and $1^f$, these plates having impressed thereon during the interval during which the characteristic of the phenomenon is to be examined, a voltage which creates an electric field which is perpendicular to the electric field between the plates $1^c$ and $1^d$ and whose gradient is transverse to the electron beam. The energization is controlled by the apparatus which will hereafter be described.

The apparatus is supplied with various direct current potentials from suitable bus bars 5, 7, 3, 9, 11, and 12. The bus bar 5 has a high negative potential with respect to the bus bar 11, whose potential is zero, while the potentials of the bus bars 7-9 inclusive are progressively less negative and the potential of bus bar 12 is positive with respect to the bus bar 11.

The system further includes a pair of high vacuum tubes 13 and 14, having cathodes $13^a$ and $14^a$, respectively, anodes $13^b$ and $14^b$, respectively, and control grids $13^c$ and $14^c$, respectively. The cathodes $13^a$ and $14^a$ are connected to the bus bar 7. The anodes $13^b$ and $14^b$ are connected to the bus bar 11 through resistors 15 and 16, respectively. Connected between the anode $13^b$ and the grid $14^c$ is a capacitor 17 and in parallel therewith a resistor 18. Similarly the anode $14^b$ is connected to the grid $13^c$ through a capacitor 19 and a parallel resistor 20. The grids $13^c$ and $14^c$ are connected to the bus bar 5 through resistors 21 and 22, respectively. A normally open push button switch 6 is connected between the grid $14^c$ and the cathodes $13^a$ and $14^a$.

The system further includes a high vacuum tube 23 having a cathode $23^a$, an anode $23^b$, and a grid $23^c$. The cathode $23^a$ is connected to the bus bar 5 through a resistor 24, while the anode $23^b$ is connected to the bus bar 12, and the grid $23^c$ is connected to the anode $14^b$.

A gaseous electron tube 25 is provided which has a cathode $25^a$, and anode $25^b$, and a grid $25^c$. The cathode $25^a$ is connected through a resistor 26 to the grid $13^c$, while the anode $25^b$ is connected to the bus bar 8, and the grid $25^c$ is connected in series with a capacitor 28 to the bus bar 5. Connected in parallel with capacitor 28 is a normally closed manual switch 29. A variable resistor 27 and a fixed resistor 30 are connected in series with each other between the anode $25^b$ and the grid $25^c$. Connected between the negative end of resistor 26 and bus bar 9 is a normally open push button switch 31 in series with a capacitor 32, said capacitor being paralled by a resistor 33.

A gaseous electron tube 34 has a cathode $34^a$, an anode $34^b$, and a grid $34^c$. The cathode $34^a$ is connected to the bus bar 5, while the anode $34^b$ is connected in series with a variable resistor 35 to the bus bar 12. The anode $34^b$ is also connected through a variable capacitor 36 to the bus bar 5 and to the anode $37^b$ of a tube 37, the cathode $37^a$ of which is connected to the bus bar 7. The anode $34^b$ is further connected to the grid $38^c$ of a high vacuum tube 38 which is also provided with a cathode $38^a$ and an anode $38^b$. The anode $38^b$ is connected to the bus bar 9 while the cathode $38^a$ is connected through a potential divider 39, having a movable contact $39^a$, to the bus bar 5. A twin triode high vacuum tube 40 is provided with cathodes $40^a$ and $40^b$ which are connected together and connected through a resistor 41 to the bus bar 5. The tube 40 is further provided with two anodes $40^c$ and $40^d$, which are connected to plates $1^f$ and $1^e$, respectively, of the cathode ray tube 1 and through the resistors 42 and 43, respectively, to the bus bar 12.

The grids $40^e$ and $40^f$ of tube 40 are connected to the system and to a network of resistors as follows: two parallel connected potential dividers 44 and 45, having movable contacts $44^a$ and $45^a$ have one of their common end terminals connected to bus bar 7, while their other common end terminal is connected through resistor 46 to bus bar 5. The movable contact $44^a$ is connected in series with a potential divider 47 having a movable contact $47^a$, to the movable contact $39^a$, while the movable contact $45^a$ is connected to the grid $40^f$ and also through a normally open contact $48^a$ of a push button switch 48 to the grid $40^e$. The switch 48 is further provided with a normally closed contact $48^b$ which is interposed between grid $40^e$ and the movable contact of the potential divider 47.

One terminal of a capacitor 49 is connected to the cathode $23^a$, while the other terminal is connected to the grid $50^c$ of a high vacuum tube 50, which also has a cathode $50^a$ and an anode $50^b$. The anode $50^b$ is connected to the bus bar 5. The grid $50^c$ is further connected through an adjustable resistor 51 to the negative terminal of a biasing battery 52, the positive terminal of which is connected to the bus bar 5.

The cathode $50^a$ is connected through a resistor 53 to the negative terminal of the battery 52 and to the cathode $54^a$ of a high vacuum tube 54. The tube 54 has an anode $54^b$ which is connected through a normally closed push button switch 55 to the grid $34^c$ and also to the movable contact $56^a$ of a potential divider 56, which is interposed between the negative terminal of battery 52 and bus bar 5, so that it is connected across the battery 52.

The system described operates in the following manner: When a voltage is impressed between the cathode $1^a$ and anode $1^b$ of the cathode ray tube, a beam of electrons is projected in the conventional manner from the cathode through the anode outwardly to a screen which is designated 57 in the drawing. This screen is coated with a fluorescent substance so that it emits light where it is struck by the electron beam.

As long as no potential difference exists between the deflecting plates $1^c$ and $1^d$, or $1^e$ and $1^f$, the beam will pass from the cathode through the anode and deflecting plates to the screen in essentially a straight line. When a potential difference does exist between either or both of these pairs of plates, however, the beam will be bent by electrostatic action and the spot on the screen will be displaced from its undeflected position. If said potential difference varies with time, the spot will move on the screen, and because of the persistence of the fluorescent material and of vision will form a line trace, the characteristics of which will be a function of the potential differences applied between the plates.

If, for example, with no potential difference between plates $1^c$ and $1^d$, a "saw tooth" voltage is impressed between plates $1^e$ and $1^f$, the electron beam will produce a straight line such as CC across the screen. The speed of travel of this beam from AA to BB depends upon the frequency of "saw-tooth" voltage while the return from BB to AA is substantially instantaneous.

If while a "saw-tooth" voltage is impressed upon the plates $1^e$ and $1^f$ a voltage is also impressed upon the plates $1^c$ and $1^d$ and the latter voltage is a function of a characteristic of a phenomenon to be studied, the electron beam is also deflected parallel with the lines AA and BB so that the beam traces on the screen curves such as are represented by D and E. The amplitude of these curves with respect to the neutral line CC is then at any given moment a measure of the magnitude of the characteristic being recorded.

As heretofore pointed out, the photo-electric cell 4 is subjected to the influence of a characteristic to be determined, and thus the potential of the plates $1^c$ and $1^d$ and therefore the amplitude of the beam with respect to the neutral line CC is a measure of such characteristic for any given instant.

For provision of a time axis, the plates $1^e$ and $1^f$ are subjected to a "saw-tooth" potential which, during any given measurement, is of constant amplitude and frequency.

The apparatus represented by the drawing makes it possible to adjust the amplitude of the "saw-tooth" voltage, its frequency and the period during which it is impressed upon the plates $1^e$ and $1^f$. The apparatus will thus produce a number of curves DE, the number depending upon the length of the period during which the plates $1^e$ and $1^f$ are under the control of the "saw-tooth" voltage and upon the frequency of the latter.

Generation of the "saw-toothed" voltage wave is effected by the combination of variable resistor 35, variable capacitor 36, and tube 34 connected between busses 5 and 12 as previously described. The potential of grid $34^c$ is adjusted initially by means of the potential divider 56 with the pushbutton switch 55 closed so that tube 34 is non-conducting. Under these conditions the capacitor 36 is charged through resistor 35 so that its terminal connected to the plate $37^b$ becomes more positive, until its voltage is sufficient to permit current flow through tube 37 which thus limits the potential of the capacitor to a value slightly more positive than that of the bus bar 7. If the negative bias of the grid $34^c$ with respect to the cathode is reduced, the tube 34 ultimately becomes conducting and upon becoming conducting it completes a discharge circuit from the positive plate of the capacitor 36, through the tube 34, to the bus bar 5, and to the negative plate of the capacitor 36. This causes an almost instantaneous discharge of capacitor 36 and substantially instantaneous reduction of the potential of grid $38^c$ to a minimum value. A graph of the resulting potential variation has the form of saw teeth; hence the term "saw-tooth" voltage as employed herein.

The varying potential obtained on the plate $34^b$ and also on the plate $37^b$ is impressed upon the grid $38^c$, thus causing a current flow through the tube 38 from the bus bar 5, through the potential divider 39 and the tube 38, to the bus bar 9. The tube 38 acts as an impedance changer with respect to the voltage of the capacitor 36 and by its use the drain on the capacitor 36 by the associated control circuit is substantially eliminated. The current passed by the tube 38 is almost directly proportional to the voltage across capacitor 36, and hence the potential of the cathode 38 varies in proportion to the voltage across the capacitor.

It will thus be apparent that the voltage impressed upon the grid $38^c$ increases in a substantially linear manner at an adjustable rate from a minimum to a maximum, the minimum being substantially that of the bus bar 5 except for the voltage drop across tube 34, whereas the maximum potential is regulated to a value which is negative with respect to the bus bar 7 by adjustment of resistor 56. The voltage impressed upon the grid $38^c$ is thus a "saw-tooth" voltage which results in a current flow through the tube 38 which is proportional to said "saw-tooth" voltage.

The current through the tube 38 produces a proportional voltage drop in the potential divider 39, the effectiveness of which upon the grid $40^e$ is determined by the position of the movable contact $47^a$ of the potential divider 47. If the movable contact $47^a$ is moved to the end connected to the movable contact $44^a$ of potential divider 44, the potential of $40^e$ is the same as that of the movable contact $44^a$, and variations of the potential of cathode $38^a$ have little effect upon grid $40^e$, whereas with the movable contact $47^a$ located at the end of potential divider 47 connected to the movable contact $39^a$, the grid $40^e$ follows the voltage variation of the movable contact $39^a$ directly.

Because of the common cathode resistor 41 it may be seen that a decrease in the bias between cathode $40^a$ and grid $40^e$ will permit more current to flow through the left hand triode of tube 40 with a resultant lowering of the potential of plate $40^c$, while at the same time the tendency toward increased current flow through the resistor 41 will tend to raise the potential of cathode $40^b$, and also $40^a$, so that the bias between cathode $40^b$ and grid $40^f$ is increased, since the potential of grid $40^f$ is fixed. This increase in bias causes less current to flow through resistor 43 so that the potential of plate $40^d$ rises. In short, an increase in the potential of grid $40^e$ causes plate $40^c$ to fall in potential and $40^d$ to rise; a decrease in the potential of grid $40^e$ causes plate $40^c$ to rise and $40^d$ to fall. the result of this action is that the potentials of the deflecting plate $1^e$ and $1^f$ are thereby caused to vary 180 degrees out of phase with each other about a fixed potential, which is also approximately the potential of the anode $1^b$ of the cathode ray tube, as will be shown below. Furthermore, the potential difference between plates $1^e$ and $1^f$ will be proportional to the potential variation of plate $34^b$, i. e., a "saw-tooth" potential variation on plate $34^b$ will appear as a "saw-tooth" potential difference between plates $1^e$ and $1^f$.

In order to provide a minimum of distortion it is customary in cathode ray oscilloscopes to maintain the average potential of each of the pairs of deflecting plates of the cathode at approximately the potential of the anode. This adjustment is initiated in the present circuit by actuating the push button 48, thereby closing contact $48^a$ and opening the contact $48^b$. This connects both of the grids $40^e$ and $40^f$ in parallel and subjects them to the potential obtaining on the movable contact $45^a$. This contact is then adjusted so that with the proper values of resistance in the resistors 41, 42, and 43, the potentials of the anodes $40^c$ and $40^d$ and thus the potentials of the deflecting plates $1^e$ and $1^f$ will be approximately zero, which is the potential of the anode $1^b$, and the bias of the grids $40^e$ and $40^f$ with respect to the cathodes $40^a$ and $40^b$ will be of a desirable magnitude.

To adjust the position of the electron beam so that the trace upon sweeping will be centered horizontally on the screen, with the push button 48 released, the movable contact $44^a$ is adjusted so that the beam spot, without sweep voltage applied, will appear at the right hand edge of the screen. This adjustment simply sets up a potential difference between the plates $1^e$ and $1^f$ and causes the beam to be deflected by approximately the maximum amount it will be when sweep voltage is applied.

The movable contact $39^a$ is adjusted at the same time so that movement of the movable contact $47^a$ causes no movement of the cathode ray beam. This adjustment simply brings the movable contact $39^a$ to the same potential as that of the contact $44^a$.

With the pushbutton 55 depressed, sweep voltage will be applied to the deflecting plates, as will be described later, and the beam will trace a horizontal line on the screen, assuming no potential variations obtain on the vertical deflecting plates $1^c$ and $1^d$. The length of the trace may be adjusted by adjustment of the potential divider 47 which determines the effectiveness of changes in the potential of the cathode $38^a$ in producing changes in the potential of the grid 40ᵉ and hence in the potential difference between the horizontal deflecting plates, 1ᵉ and 1ᶠ.

The grid bias of the tube 34 is adjusted by adjustment of the contact 56ᵃ so that the tube 34 will conduct when the tube 54 is non-conducting or when pushbutton switch 55 is open. When the tube 54 is conducting, however, and the pushbutton switch 55 is closed, the voltage impressed upon the grid 34ᶜ is sufficiently negative to prevent conduction of the tube 34.

To initiate the sweep cycle through the tube 34 it is necessary to render the tube 54 non-conducting and thereby subject the grid 34ᶜ to the potential of the movable contact 56ᵃ. The tube 54 is rendered non-conducting by causing sufficient current to flow through the cathode resistor 53 to make the cathode 54ᵃ positive with respect to the anode 54ᵇ. Current through resistor 53 is caused to flow by making the tube 50 conducting. The potential of the grid 50ᶜ is ordinarily the same as that of the negative end of the battery 52 and since the cathode 50ᵃ is positive with respect to the grid by the magnitude of the voltage drop across resistor 53, tube 50 will be non-conducting. When, however, the tube 14 is suddenly made non-conducting, grid 23ᶜ will momentarily be rendered positive, the potential of cathode 23ᵃ will follow and through capacitor 49 grid 50ᶜ will also be rendered temporarily positive, resulting in current conduction by tube 50. The time constant of the combination comprising resistor 51, capacitor 49, and tube 23 determines the length of time during which tube 50 will remain conducting, and hence the number of sweeps of the cathode ray beam across the screen. Adjustment of resistor 51 and/or of the capacitor 49 therefor provides control over the number of sweeps.

As has already been explained, a recording interval is initiated by rendering the tube 14 non-conducting. To render the tube 14 non-conducting requires that its grid be lowered below the cut-off potential. This is accomplished by rendering the tube 13 conducting. To render the tube 13 conducting, the potential of its grid must be raised. This may be accomplished by closing the pushbutton switch 31 which momentarily raises the potential of the grid 13ᶜ by the required amount.

The system provides for another method of initiating conduction by the tube 13. This second method provides an adjustable delay between the initiation of conduction and actual conduction by the tube 13. To carry out the second method the switch 29 is opened. This initiates charging of the capacitor 28 by a current from the bus bar 8 through resistors 30 and 27 and into capacitor 28. The charging rate of the capacitor and thus the time delay may be varied by adjustment of the resistor 27. The positive terminal of the capacitor 28 is connected to the grid 25ᶜ of the tube 25. As the capacitor becomes charged, the tube 25 becomes conducting and a current flows from the bus bar 8 through the tube 25 through the resistors 26 and 21, and to the bus bar 5. The increased potential drop effected across resistor 21 raises the potential of the grid 13ᶜ thereby starting conduction of the tube 13. To reset the "trigger" circuit for another series of sweeps, the pushbutton switch 6 is actuated. This raises the potential of the grid 14ᶜ, thereby causing the tube 14 to become conducting and to lower the potential of its plate 14ᵇ. The lowering of the potential of the plate 14ᵇ also lowers the potential of grid 13ᶜ connected therewith to a point where 13 becomes non-conducting once more.

Summing up the adjustments which are permitted by this circuit: Potential divider 45, with pushbutton 46 depressed, permits making the potential of deflection plates 1ᵉ and 1ᶠ equal to that of the anode, when no signal is being applied.

Potential dividers 44 and 39 permit adjustment of the beam spot to the point on the screen desired for maximum horizontal deflection.

Potential divider 47 permits adjustment of the magnitude of sweep deflection.

Variable resistor 35 and variable capacitor 36 permit selection of the sweep frequency.

Variable resistor 51 controls the number of sweeps permitted each time the circuit is tripped.

Variable resistor 27 controls the delay in initiating the first sweep after switch 29 has been opened.

Summing up the operation of the circuit during one complete cycle:

Starting with the trigger circuit "set," switch 29 is opened, after a predetermined delay, tube 25 becomes conducting, tube 13 becomes more conducting, tube 14 is cut off, tube 50 becomes conducting, tube 54 is cut off, and tube 34 "fires," discharging capacitor 36. This sudden drop moves the electron beam to the left side of the screen by means of the changes in potentials transmitted through tubes 38 and 40 and their related resistors.

Tube 34 cuts itself off by the reduction of potential it effects, whereupon capacitor 36 is gradually charged through variable resistor 35. This potential change causes the beam to move at a predetermined rate or sweep across the screen from left to right. At some potential across the tube 34, depending upon the bias adjustment of potential divider 56, tube 34 will again fire, the beam spot will be moved to the left and a second sweep will start.

Sweeping cycles will continue until the current drawn by tube 50 has diminished to the point where tube 54 is again sufficiently conducting to lower the potential of grid 34ᶜ to such a value that tube 34 cannot fire with the maximum potential allowed its plate by the voltage limiting tube 37. During this series of sweeps the vertical deflection plates 1ᶜ and 1ᵈ have been supplied with a potential difference which is proportional to the current through photo tube 4 or such other signal as has been supplied. The resultant of these two simultaneous electrostatic fields on the electron beam causes a pattern to be traced, such as indicated on screen 57. This pattern may be photographed, if desired, for further study.

The circuit now remains in the "tripped" condition until reset by operating pushbutton 55, whereupon tube 14 is made conducting again, and the circuit is ready for another complete cycle.

I claim:

1. The method of producing by means of a beam of electrons a trace which indicates a characteristic of a transient phenomenon during a fractional period thereof, comprising, generating an electron beam of normally fixed direction, inducing adjacent to said beam an electric field whose gradient is transverse to said direction and varying its magnitude in accordance with variations of the characteristic to be indicated for deflecting said beam in accordance with the magnitude of said field, and further inducing during a desired preselected fractional period of said transient phenomenon adjacent to said beam a plurality of oscillations of a periodically varying electric field whose gradient is transverse to said beam, but is angularly displaced with respect to the gradient of said first field.

2. The method of producing by means of a beam of electrons a trace which indicates a characteristic of a transient phenomenon during a fractional period thereof, comprising, generating an electron beam of normally fixed direction, inducing adjacent to said beam an electric field whose gradient is transverse to said direction and varying its magnitude in accordance with variations of the characteristic to be indicated for deflecting said beam in accordance with the magnitude of said field, and further inducing during a desired preselected fractional period of said transient phenomenon adjacent to said beam a plurality of oscillations of a periodically varying electric field whose variation in magnitude relative to time is represented by a "saw-tooth" wave, the gradient of said last mentioned field being transverse to said beam, but is angularly displaced with respect to the gradient of said first field.

3. The method of producing by means of a beam of electrons a trace which indicates a characteristic of a transient phenomenon during a fractional period thereof, comprising, generating an electron beam of normally fixed direction, inducing adjacent to said beam an electric field whose gradient is transverse to said direction and varying its magnitude in accordance with variations of the characteristic to be indicated for deflecting said beam in accordance with the magnitude of said field, and further inducing during a desired preselected fractional period of said transient phenomenon adjacent to said beam a plurality of oscillations of a periodically varying electric field whose variation in magnitude relative to time is represented by a "saw-tooth" wave, the gradient of said last mentioned field being transverse to said beam but at right angle to the gradient of said first field.

4. The method of producing by means of a beam of electrons a trace which indicates a characteristic of a transient phenomenon during a fractional period thereof, comprising, generating an electron beam of normally fixed direction, inducing adjacent to said beam an electric field whose gradient is transverse to said direction and varying its magnitude in accordance with variations of the characteristic to be indicated for deflecting said beam in accordance with the magnitude of said field, and further inducing during a desired preselected fractional period of said transient phenomenon adjacent to said beam a plurality of oscillations of a periodically varying electric field whose magnitude increases at a substantially constant rate from a minimum to a maximum and returns to said minimum substantially instantly during each cycle and whose gradient is transverse to said beam and transverse to the gradient of said first field.

5. In a system for recording a characteristic of a transient phenomenon during a desired fractional period thereof, said system including means responsive to said characteristic and means for recording said characteristic as a function of elapsed time, the combination with a translating circuit of said last named means, of means to generate an oscillating voltage of a given frequency and amplitude, and means to preselect the moment of starting generation of said voltage and to subject said circuit to an influence of said voltage including means to maintain said oscillating voltage for a preselected number of oscillations.

6. In a system for recording a characteristic of a transient phenomenon during a desired fractional period thereof, said system including means responsive to said characteristic and means for recording said characteristic as a function of elapsed time, the combination with a translating circuit of said last named means, of means to generate an oscillating voltage of a given frequency and amplitude, manual means to present the moment of starting generation of said voltage and to subject said circuit to an influence of said voltage, means to maintain said oscillating voltage for a preselected number of oscillations and alternate manual means operative to initiate and maintain generation of said voltage independent of said preceding maintaining means.

7. In a system for generating a given number of cycles of oscillating voltage, the combination of a capacitor and resistor connectable in circuit with a unidirectional source of current for charging said capacitor, a gaseous electron tube having a cathode, an anode and a control electrode and having its main discharge path connected in parallel with said capacitor to discharge the same in response to a potential impressed upon said control electrode, means to impress a potential on said control electrode to normally render said tube non-conducting and to change said potential to a value which initiates current conduction by said tube, and adjustable means arranged to restore said potential to its initial value after a preselected plurality of cycles of said oscillating voltage.

8. In a system for generating a given number of cycles of oscillating voltage, the combination of a capacitor and a resistor connectable in circuit with a unidirectional source of current for charging said capacitor, a first gaseous electron tube having a cathode, an anode and having its main discharge path a control electrode and connected in parallel with said capacitor to discharge the same in response to a potential impressed upon said control electrode, means to impress a potential on said control electrode to normally render said tube non-conducting, a second normally conducting electron tube adapted when rendered non-conducting to change said potential to a value which initiates current conduction by said first tube and energy storing timing means arranged to render said second tube non-conducting for a preselected period of time.

9. In a system for generating a given number of cycles of oscillating voltage, the combination of a capacitor and a resistor connectable in circuit with a unidirectional source of current for charging said capacitor, a first gaseous electron tube having a cathode, an anode and having its main discharge path a control electrode and connected in parallel with said capacitor to discharge the same in response to a voltage impressed upon said control electrode, means to impress a potential on said control electrode to normally render said tube non-conducting, a second normally conducting electron tube arranged when rendered non-conducting to change said potential to a value which initiates current conduction by said first tube, a third electron tube, means to render said second tube non-conducting when the conduction of said third tube is above a certain minimum, and energy storing timing means arranged to render said third tube conducting and said second tube non-conducting for a given period.

10. A timing system, comprising, a pair of oscillating electron tubes, one of said tubes being normally conducting, a third and a fourth electron tube, said third tube being a gaseous tube and each of said tubes having a control electrode, a capacitor connected in parallel with the main discharge path of said third tube and also connected to the control electrode of said fourth tube, the control electrode of said third tube being connected in circuit with one of said oscillating tubes and being arranged to vary the current conduction of said third tube inversely to variations of the current conduction of said one oscillating tube, and means to render said other oscillating tube conducting and thereby stop current conduction through said one tube and to increase the current conduction through said third tube to vary the charge of said capacitor and impress the voltage of said capacitor on the control electrode of said fourth tube for varying the current through said fourth tube in accordance with the variations of said charge.

WALTHER RICHTER.

REFERENCES CITED

The following references are of record in the file of this patent:

UNITED STATES PATENTS

| Number | Name | Date |
| --- | --- | --- |
| 1,933,219 | Nakajima et al. | Oct. 31, 1933 |
| 1,934,322 | Osbon | Nov. 7, 1933 |
| 2,088,495 | Swedlund | July 27, 1937 |
| 2,122,499 | Stocker | July 5, 1938 |
| 2,153,140 | Diehl et al. | Apr. 4, 1939 |
| 2,215,197 | Sherman | Sept. 17, 1940 |
| 2,233,810 | Dawson | Mar. 4, 1941 |
| 2,254,601 | Felch | Sept. 2, 1941 |
| 2,264,018 | Case | Nov. 25, 1941 |
| 2,264,019 | Case | Nov. 25, 1941 |
| 2,265,825 | Urtel | Dec. 9, 1941 |
| 2,269,151 | Garman | Jan. 6, 1942 |
| 2,280,531 | Norgaard | Apr. 21, 1942 |
| 2,286,894 | Browne et al. | June 16, 1942 |
| 2,310,328 | Swift | Feb. 9, 1943 |
| 2,313,967 | Read, Jr. | Mar. 16, 1943 |
| 2,315,848 | Geohegan | Apr. 6, 1943 |
| 2,347,008 | Vance | Apr. 18, 1944 |
| 2,350,069 | Schraeder et al. | May 30, 1944 |
| 2,354,086 | MacKay | July 18, 1944 |
| 2,367,728 | Mahoney, Jr. | Jan. 23, 1945 |

FOREIGN PATENTS

| Number | Country | Date |
| --- | --- | --- |
| 426,201 | Great Britain | Mar. 19, 1935 |

Certificate of Correction

Patent No. 2,477,770                                        August 2, 1949

WALTHER RICHTER

It is hereby certified that errors appear in the printed specification of the above numbered patent requiring correction as follows:

Column 1, line 10, for "eletcrical" read *electrical*; column 6, line 21, for the word "plate" read *plates*; column 8, line 33, for "whereupuon" read *whereupon*; column 10, line 12, claim 6, for the word "present" read *preselect*; line 42, claim 8, and line 60, claim 9, after the word "anode" insert *and a control electrode*; line 43, claim 8, and line 61, claim 9, after "path" strike out "a control electrode and";

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*